United States Patent
Choi

(10) Patent No.: US 9,727,280 B2
(45) Date of Patent: Aug. 8, 2017

(54) MODIFYING GENERIC WORKFORM RECEIVED FROM HOST WITH SPECIFIC INPUT PLUG-IN DATA BASED ON SELECTED CAPABILITY OF WORKFORM PERFORMING DEVICE

(75) Inventor: Young-woo Choi, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 1012 days.

(21) Appl. No.: 12/707,809

(22) Filed: Feb. 18, 2010

(65) Prior Publication Data
US 2011/0055832 A1  Mar. 3, 2011

(30) Foreign Application Priority Data

Sep. 1, 2009 (KR) .................. 10-2009-0082042

(51) Int. Cl.
G06F 3/12 (2006.01)
H04N 1/00 (2006.01)

(52) U.S. Cl.
CPC .......... *G06F 3/1205* (2013.01); *G06F 3/1253* (2013.01); *G06F 3/1285* (2013.01); *H04N 1/00* (2013.01); *H04N 1/0022* (2013.01); *G06F 3/1204* (2013.01); *H04N 2201/0094* (2013.01)

(58) Field of Classification Search
CPC .... G06F 3/1205; G06F 3/1285; G06F 3/1253; G06F 3/1204; H04N 1/00; H04N 1/0022; H04N 2201/0094
See application file for complete search history.

(56) References Cited

U.S. PATENT DOCUMENTS

| 6,407,821 | B1 * | 6/2002 | Hohensee | G06F 3/1213 |
| | | | | 358/1.15 |
| 7,401,914 | B2 * | 7/2008 | Yokoi | B41J 3/60 |
| | | | | 347/101 |
| 7,424,717 | B2 * | 9/2008 | Blevins | 719/318 |
| 7,466,442 | B2 * | 12/2008 | Chapman | G06F 3/1204 |
| | | | | 358/1.12 |

(Continued)

FOREIGN PATENT DOCUMENTS

| JP | EP 0982650 A1 * | 3/2000 | G06F 3/121 |
| JP | 2006215853 | 8/2006 | |

(Continued)

OTHER PUBLICATIONS

Extended European Search Report dated Dec. 7, 2012 issued in EP Application No. 10158004.1.

(Continued)

*Primary Examiner* — Benjamin Wu
(74) *Attorney, Agent, or Firm* — Staas & Halsey LLP

(57) ABSTRACT

A host device includes a communication interface unit to be connected to a workform performing device, a workform generation unit to perform a job and generate a workform to which a universal plug-in is applied, a storage unit to store at least one of the workform generated by the workform generation unit and a workform transmitted from an external device, and a control unit to control the communication interface unit to transmit the at least one stored workform to the workform performing device according to a command to perform a job.

12 Claims, 9 Drawing Sheets

(56) References Cited

U.S. PATENT DOCUMENTS

| | | | | |
|---|---|---|---|---|
| 7,999,951 B2* | 8/2011 | Ferlitsch | | G06F 3/1206 |
| | | | | 358/1.13 |
| 8,230,200 B2* | 7/2012 | Imamichi | | G06F 9/4843 |
| | | | | 712/208 |
| 8,325,385 B2* | 12/2012 | Plummer | | H04N 1/603 |
| | | | | 345/589 |
| 8,681,352 B2* | 3/2014 | Shenoy | | G06F 3/1205 |
| | | | | 358/1.1 |
| 8,743,390 B2 | 6/2014 | Song | | |
| 8,873,087 B2* | 10/2014 | Akahane | | G06F 3/1208 |
| | | | | 358/1.11 |
| 2002/0161888 A1* | 10/2002 | McGuire | | H04L 41/0213 |
| | | | | 709/226 |
| 2003/0184782 A1* | 10/2003 | Perkins | | G06F 3/1204 |
| | | | | 358/1.13 |
| 2005/0028073 A1* | 2/2005 | Henry et al. | | 715/500 |
| 2005/0055476 A1* | 3/2005 | Aschenbrenner | | G06F 3/1205 |
| | | | | 710/15 |
| 2005/0179921 A1* | 8/2005 | Brossman | | G06F 3/1205 |
| | | | | 358/1.13 |
| 2005/0225789 A1* | 10/2005 | Ferlitsch | | G06F 3/1204 |
| | | | | 358/1.13 |
| 2005/0248795 A1* | 11/2005 | Vorhees | | G06K 15/02 |
| | | | | 358/1.13 |
| 2007/0002689 A1* | 1/2007 | Mateescu et al. | | 367/73 |
| 2007/0009277 A1* | 1/2007 | Shoen | | G03G 15/5029 |
| | | | | 399/82 |
| 2007/0035763 A1* | 2/2007 | Bard et al. | | 358/1.15 |
| 2007/0070374 A1* | 3/2007 | Boyes | | G06F 3/1204 |
| | | | | 358/1.13 |
| 2007/0183002 A1* | 8/2007 | Corona | | 358/474 |
| 2008/0002220 A1* | 1/2008 | Song | | 358/1.15 |
| 2008/0010369 A1* | 1/2008 | Hwang | | 709/223 |
| 2008/0016520 A1* | 1/2008 | Kong | | 719/329 |
| 2009/0180141 A1* | 7/2009 | Takaishi | | G03G 15/5075 |
| | | | | 358/1.15 |
| 2009/0237699 A1* | 9/2009 | Umezawa | | 358/1.13 |
| 2009/0282412 A1* | 11/2009 | Sekine et al. | | 718/102 |
| 2010/0107165 A1* | 4/2010 | Koskimies et al. | | 718/100 |
| 2010/0245884 A1* | 9/2010 | Komine | | G06F 3/1255 |
| | | | | 358/1.15 |
| 2010/0318964 A1* | 12/2010 | Bouldin | | G06F 8/75 |
| | | | | 717/120 |

FOREIGN PATENT DOCUMENTS

| | | |
|---|---|---|
| KR | 10-2008-0000761 | 1/2008 |
| KR | 20080006398 | 1/2008 |

OTHER PUBLICATIONS

"SmarThru Workflow 2 Document Capture and Distribution", Samsung Electronics, Aug. 12, 2009 (Aug. 12, 2009), pp. 1-12, XP002688055, Retrieved from the Internet: samsung.com/ca/knowledge_centre/printers/WhitePapers/SmarThruWorkflow2_WP_A4_Rev0A.pdf [retrieved on Nov. 27, 2012] *p. 5-p. 6*.

Korean Notice of Preliminary Rejection issued May 19, 2015 in corresponding Korean Patent Application No. 10-2009-0082042.

Summons to Attend Oral Proceedings dated Apr. 6, 2017 in corresponding European Application No. 10 158 004.1.

* cited by examiner

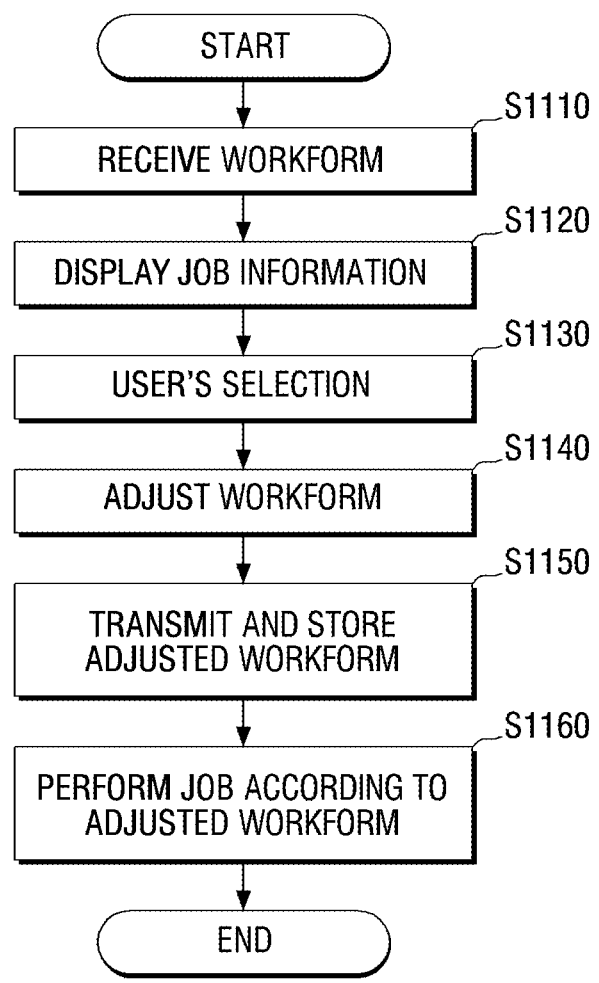

MODIFYING GENERIC WORKFORM RECEIVED FROM HOST WITH SPECIFIC INPUT PLUG-IN DATA BASED ON SELECTED CAPABILITY OF WORKFORM PERFORMING DEVICE

CROSS-REFERENCE TO RELATED APPLICATIONS

This application claims priority under 35 U.S.C. §119 (a) from Korean Patent Application No. 10-2009-0082042, filed on Sep. 1, 2009, in the Korean Intellectual Property Office, the disclosure of which is incorporated herein by reference in its entirety.

BACKGROUND

1. Field of the Invention

The present general inventive concept is generally directed towards the use of workforms to perform various jobs in a computer network. As will be defined more fully below, a workform, as used herein, is a mechanism by which structured data may be transported between components. Embodiments of the present general inventive concept relate to a host device, a workform performing device, a method for generating a workform, and a method for performing in accordance with a workform. More particularly, the present general inventive concept generally relates to a host device which generates a workform which can be used in diverse devices, a workform performing device, a method for generating a workform, and a method for performing in accordance with a workform.

2. Description of the Related Art

Thanks to development of networks, a plurality of user terminal devices can share a plurality of image forming apparatuses and a user can perform jobs using a plurality of image forming apparatuses.

To do this, the user accesses a server, creates a plurality of workforms to manage jobs provided by a plurality of image forming apparatuses. The repeated jobs can easily be performed using the workforms.

However, a conventional workform is generated to in accordance with a capability of an image forming apparatus, and thus can be used only on a corresponding image forming apparatus. Thus, if an image forming apparatus for which a workform has been created is currently invalid or unavailable, the conventional workform cannot be used in another image forming apparatus, and the user is required to make a new workform.

In addition, if an image forming apparatus supports a plurality of capabilities, a conventional workform corresponding to each capability must be generated. Accordingly, even through a destination device is the same, if inputs are different, a plurality of workforms are required.

SUMMARY

The present general inventive concept provides means by which a workform may be generated and used in diverse devices.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a host device which may be connected to a workform performing device to perform a job in accordance with a workform which defines job operations. The host device may include a communication interface unit to be connected to the workform performing device, a workform generation unit to perform a job and/or generate a workform in which a universal plug-in is applied, a storage unit to store at least one of the workform generated by the workform generation unit and a workform transmitted from an external device, and a control unit to control the communication interface unit to transmit the at least one stored workform to the workform performing device according to a command to perform a job. The universal plug-in may include information generic to a plurality of workform performing devices inclusive of the workform performing device and which the workform performing device can modify to perform.

The generic data in the universal plug-in may be independent of a job capability of at least one workform performing device.

The foregoing and/or other aspects and utilities of the present general inventive concept may be achieved by providing a workform performing device which may be connected to a host device and perform a job using a workform in which a universal plug-in is applied. The workform performing device may include a storage unit to store capability information regarding at least one capability supported by the workform performing device, a communication interface unit to receive the workform from the host device that includes the universal plug-in, a user interface (UI) unit to enable a user to select at least one capability from among the capability information stored in the storage unit, a workform adjustment unit to adjust the workform based on the selected capability, and a control unit to perform the job using the adjusted workform.

The generic information in the universal plug-in may include information which at least one workform performing device accepts to define operations to perform a job.

The control unit may control the storage unit to store the adjusted workform.

The user interface unit may enable the user to select at least one of fax data, email data, scan data, first storage data stored in an external storage medium, and second storage data stored in the workform performing device, which are data types supported by the workform performing device.

The workform performing device may be at least one of an image forming apparatus, a server, a computer, and a mobile device, which can perform the job in accordance with the workform.

The user interface unit may display the at least one capability supported by the workform performing device, and enable the user to select at least one of the displayed capability and select a setting value corresponding to the selected capability.

The user interface unit may transmit data generated after performing the job to the host device together with the adjusted workform.

The foregoing and/or other aspects and utilities of the present general inventive concept may be achieved by providing a method for generating a workform using a host device which may be connected to a workform performing device to perform the workform which defines job operations in accordance with the workform. The method may include generating a workform containing a universal plug-in including data generic to a plurality of workform performing devices inclusive of the workform performing device, storing at least one of the workform generated by the workform generation unit and a workform transmitted from an external device, and transmitting the at least one stored workform to the workform performing device according to a command to perform the job.

The foregoing and/or other aspects and utilities of the present general inventive concept may be achieved by providing a method for performing a job in accordance with a workform using a workform performing device which may be connected to a host device. The method may include receiving the workform in which universal plug-in is applied from the host device, the universal plug-in containing data generic to a plurality of workform devices inclusive of the workform device, selecting at least one capability from among pre-stored capability information regarding at least one capability supported by the workform performing device, adjusting the universal plug-in in the workform in accordance with the selected capability, and performing the job using the adjusted workform.

The method may further include storing the adjusted workform.

In the selecting of the at least one capability, at least one of fax data, email data, scan data, first storage data stored in an external storage medium, and second storage data stored in the workform performing device, which are inputs supported by the workform performing device may be selected.

In the selecting of the at least one capability, the at least one capability supported by the workform performing device may be displayed, at least one of the displayed capability may be selected, and a detailed setting value corresponding to the selected capability may be selected.

The method may further include transmitting data generated after performing the job to the host device together with the adjusted workform.

The foregoing and/or other aspects and utilities of the present general inventive concept may also be achieved by a method for performing a job on a workform performing device capable of performing the job. A workform may be generated in which information pertaining to at least one job operation of the job is generic to a plurality of diverse workform performing devices. The workform may be retrieved at one of the diverse workform performing devices capable of performing the job operation and the generic data in the workform may be modified to define at least one parameter of the job operation specific to the workform performing device. The job may then be performed on the workform performing device in accordance with the modified workform.

The foregoing and/or other aspects and utilities of the present general inventive concept may also be achieved by a tangible computer-readable medium having stored thereon instructions that, when executed by data processing machinery, performs a method for performing a job on a workform performing device capable of performing the job such as that in the immediately preceding paragraph.

The forgoing and/or other aspects and utilities of the present general inventive concept may also be achieved by an apparatus to perform a data processing job. The apparatus may include a workform management device having stored therein at least one workform in which information pertaining to at least one job operation is generic to a plurality of diverse workform performing devices. A workform performing device may be included to modify the generic job operation information in the workform so as to define a specific job operation of which the workform performing device is capable.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which

FIG. 11 is a flow chart illustrating a method for performing a workform using a workform performing device according to an exemplary embodiment of the present general inventive concept.

DETAILED DESCRIPTION OF THE EMBODIMENTS

Figure 1:
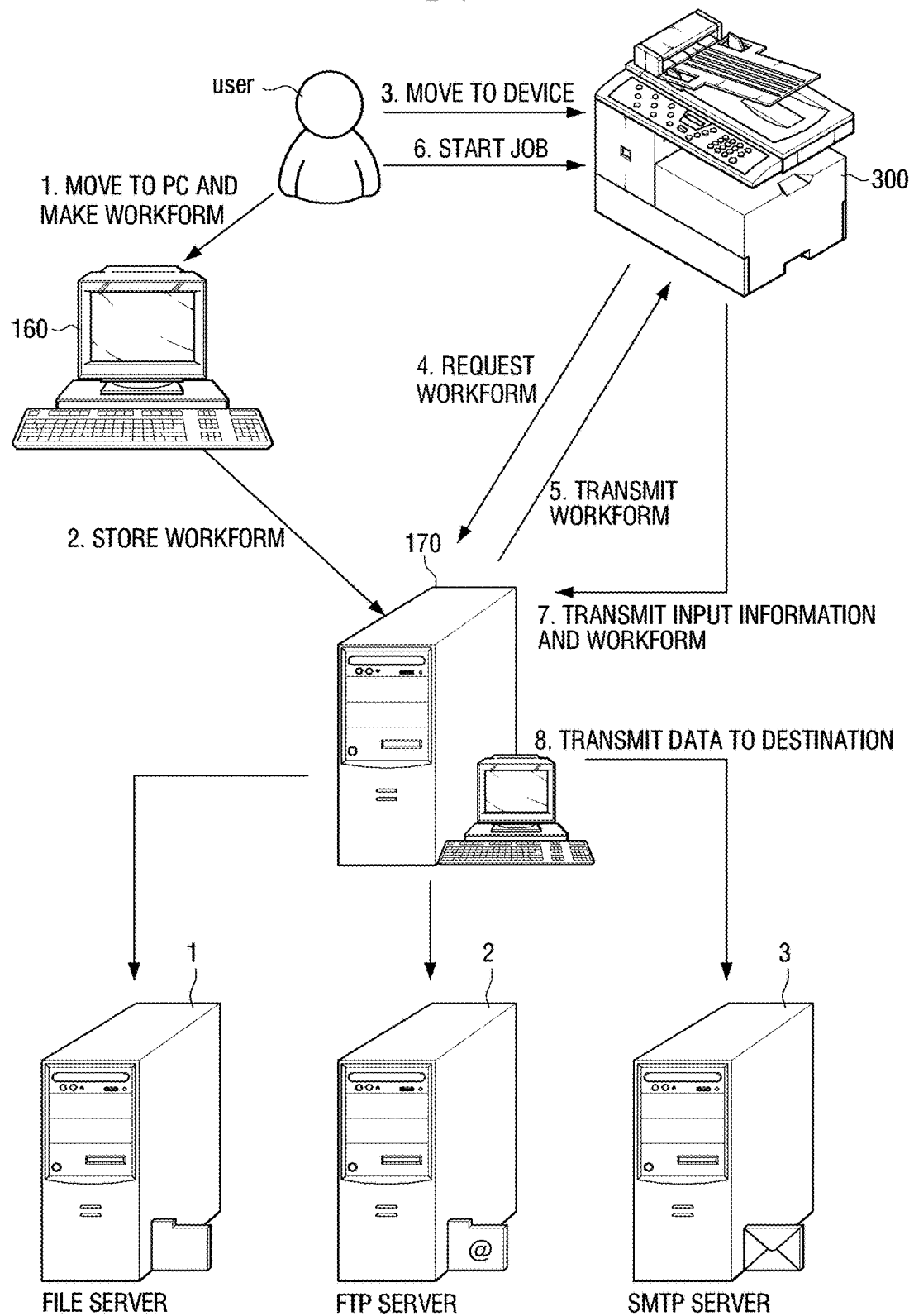
FIG. 1 is a schematic diagram illustrating a workform management system according to an exemplary embodiment of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

As used herein, a workform is a mechanism by which structured data can be stored and/or transported between devices, typically devices interconnected by one or more communication channels such as in an intra- or internet. The present general inventive concept is not limited as to how the data is structured within a workform or to the data format. However, the descriptions of the embodiments below will assume, without limitation thereto, the workform to be in the form of a text file.

FIG. 1 is a schematic diagram illustrating a workform management system according to an exemplary embodiment of the present general inventive concept.

Referring to FIG. 1, the workform management system may include a user terminal device 160, a workform management device 170, and a workform performing device 300, which are connected to one another over a wireless and/or wired network. The user terminal device 160 may be a personal computer, a personal digital assistant (PDA), a laptop computer, or the like. The workform performing device 300 is a device capable of performing jobs in accordance with a workform generated by the user terminal device 160 or the workform management device 170, and may be a multifunction device, a printer, a facsimile machine, a scanner, a copy machine, or the like. In certain embodiments of the present general concept, there may be a plurality of user terminal devices 160 and a plurality of workform performing devices 300 in the workform management system, but a single user terminal device 160 and a single workform performing device 300 are illustrated in FIG. 1 for convenience of description.

The workform management device 170 may store a user's pre-registered login information (ID and password), and a plurality of workforms may be stored in an account for each of the users. In addition, a workform management solution to make a workform is installed in the workform management device 170. The workform management device 170 may be isolated in an area and managed by a manager, or may be a public computer available to general users. The workform management device 170 may have data processing capabilities as a transformer to transform or operate on data, or may be a destination to which the data are transmitted and stored.

The workform performing device 300 receives a workform selected by the user from the workform management device 170, displays the workform or an abstraction thereof, and operates based on a job description in the displayed workform. The workform performing device 300 may operate as a source for providing data, as a transformer for transforming data, or as a destination to which data are transmitted.

A workform may include information needed to perform a job for which the workform performing device 300 is capable. For example, a workform may include information such as a job operations as written by the user, a device on which to perform the job, an order for processing the job, job conditions and parameters, a location for storing output data of the job, and the like. If a stored workform is used, the user can simply repeat a job without manually reentering the job settings at the workform performing device 300. A workform may be generated in any suitable format, but for purposes of description and not limitation, the workform embodiments below will be illustrated and described as text files in Extensible Markup Language (XML).

A general workform includes source for providing data and a destination to which the data are transmitted. For example, the data to be processed may be a document to be scanned and stored. In such a case, the source may be a workform performing device 300 capable of scanning the document and the destination may be a file server 1, a File Transfer Protocol (FTP) server 2, or a Simple Mail Transfer Protocol (SMTP) server 3.

Traditionally, if data corresponding to a specific operation are set in a workform, the workform can perform only that specific operation and only in the specific device for which and/or at which the workform was created. That is, no device other than the specific device set in the workform can use the workform, and the work form cannot be used for device capability other than that set in the workform.

Accordingly, in certain embodiments of the present general inventive concept, a workform is generated to include a universal plug-in. A plug-in, as used herein, is a subset of data that can be inserted into workform data to define job parameters or operations. Exemplary plug-ins include a plug-in for requesting a scanning operation, a plug-in for requesting a faxing operation, a plug-in for requesting an optical character recognition (OCR) function, a plug-in for requesting e-mail transmission, and the like. A universal plug-in, as used herein, is a subset of data within the workform that is independent of a specific workform performing device platform by which a job is performed or which is generic to a plurality of diverse workform performing devices, and in which operational parameters of the workform performing device platform are not set. The universal plug-in may include identifying information that can be recognized by at least one workform performing device. In accordance with the present general inventive concept, a workform may be generated without specifying a particular capability of a device, and the generated workform may thus be used in diverse devices.

The user may create or modify a workform and request a job using the user terminal device 160, the workform management device 170, or the workform performing device 300. For example, the user may log on to the workform management device 170 through the user terminal device 160, and the workform management device 170 may subsequently provide the user with a graphical user interface (GUI) to generate a workform through the user terminal device 160, so the user can make a workform including a universal plug-in. Alternatively, the user may create and modify the workform and request a job using the GUI at the workform performing device, such as through a user control panel.

Referring to FIG. 1, an exemplary process in accordance with the present general inventive concept is illustrated. In operation (1), the user can create a workform including a universal plug-in using the user terminal device 160 and, in operation (2), the created workform is transmitted to and stored in the workform management device 170. The workform may be written and stored as a text file in a suitable description language, such as XML. Although FIG. 1 illustrates that the user generates a workform using the user terminal device 160, in certain embodiments of the present general inventive concept, it is possible for the user to generate a workform directly using the workform management device 170.

If the user moves to the workform performing device 300, such as in operation (3), and requests the workform, such as in operation (4), the workform management device 170 may transmit the stored workform to the workform performing device 300. In certain embodiments of the present general inventive concept, the workform management device 170 may modify the workform, prior to transmission to the workform performing device, by inserting into the workform pre-stored capability information. Detailed operation of an exemplary embodiment of such is discussed below with reference to FIGS. 3 to 6.

In operation (6), the user may select a desired workform and request the running of a job. The workform performing device 300 may adjust a parameter of the modified workform according to the selected job and subsequently perform one of its functions or capabilities according to the adjusted workform. In operation (7), the workform performing device 300 may transmit to the workform management device 170 data generated or processed according to the performed capability of the workform performing device 300. Additionally, the workform performing device may transmit the adjusted workform to the workform management device 170. Subsequently, in operation (8), the workform management device 170 may process the received data according to the received workform and may then transmit the processed data to a destination.

Figure 2:
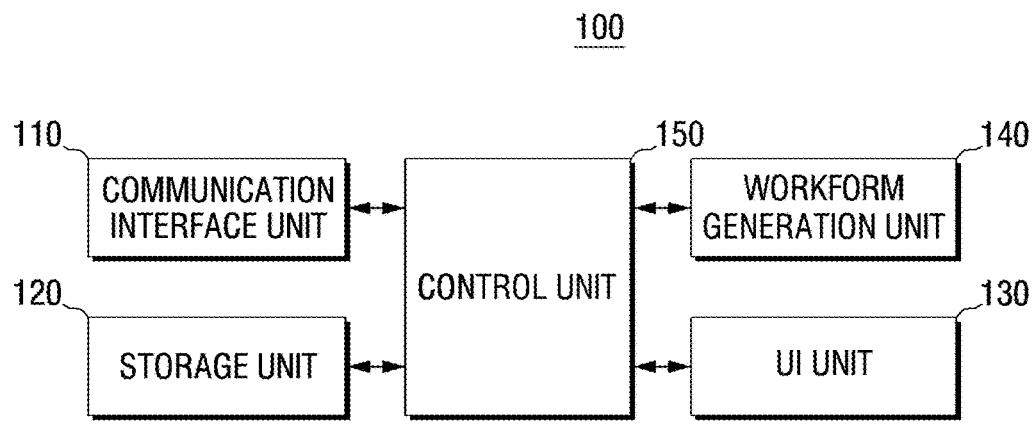
FIG. 2 is a schematic block diagram illustrating a configuration of a host device according to an exemplary embodiment of the present general inventive concept.

FIG. 2 is a schematic block diagram illustrating a configuration of a host device 100 according to an exemplary embodiment of the present general inventive concept.

Referring to FIG. 2, the host device 100 may include a communication interface unit 110, a storage unit 120, a user interface (UI) unit 130, a workform generation unit 140, and a control unit 150. The functionality of the host device 100 may be fulfilled by the user terminal device 160 or the workform management device 170 as illustrated in FIG. 1.

The exemplary communication interface unit 110 may be connected to the workform performing device 300 through a communication network (not shown). In particular, the communication interface unit 110 receives, among other things, user authentication information, a workform transmission request command, an adjusted workform, and data from the workform performing device 300, and transmits, among other things, a generated workform to the workform performing device 300. The communication interface unit 110 may be implemented in a parallel port, a universal serial bus (USB) port, a wireless or wired network port, or the like, so as to enable the host device 100 to be connected to an external device.

The exemplary storage unit 120 stores, among other things, a universal plug-in and a plurality of destination plug-ins. In addition, the storage unit 120 may store one or both of a workform generated by the workform generation unit 150 and a workform transmitted from an external device. For example, the storage unit 120 may store a workform generated at the host device 100, such as by a process discussed below, may store an adjusted workform received through the communication interface unit 110 and may store data processed by the workform performing device 300. The storage unit 120 may be implemented by any suitable data storage system, such as, for example, an internal storage medium formed in the host device 100, an external storage medium, a removable disk including a USB memory, and/or a web server connected through a network.

A destination plug-in, as used herein, is a data subset that can be inserted into a workform to specify destination processing of data generated or processed by a device, including for example, a plug-in for requesting e-mail transmission, a plug-in for requesting storage of the data in an FTP server, a plug-in for requesting storage of the data in a file server, and the like. Similarly, an input plug-in is a data subset that can be inserted into a workform to specify source processing for a particular job. A universal input plug-in is an input plug-in which is independent of capabilities of a specific workform performing device 300, that is, is an input plug-in in which a data source is left undefined. An exemplary universal input plug-in is illustrated in an area 410 of FIG. 4.

The exemplary UI unit 130 includes a plurality of capability keys which enable the user to set or select diverse capabilities supported by the host device 100, and displays diverse information provided by the host device 100. The UI unit 130 may be implemented with a touch-sensitive display device capable of input and output, or with a combination of a Human Interface Device (HID), such as a mouse and/or a keyboard, and a monitor. The user may input a workform generation command or select at least one of the plurality of destination plug-ins using a UI window provided by the UI unit 130.

Figure 4:
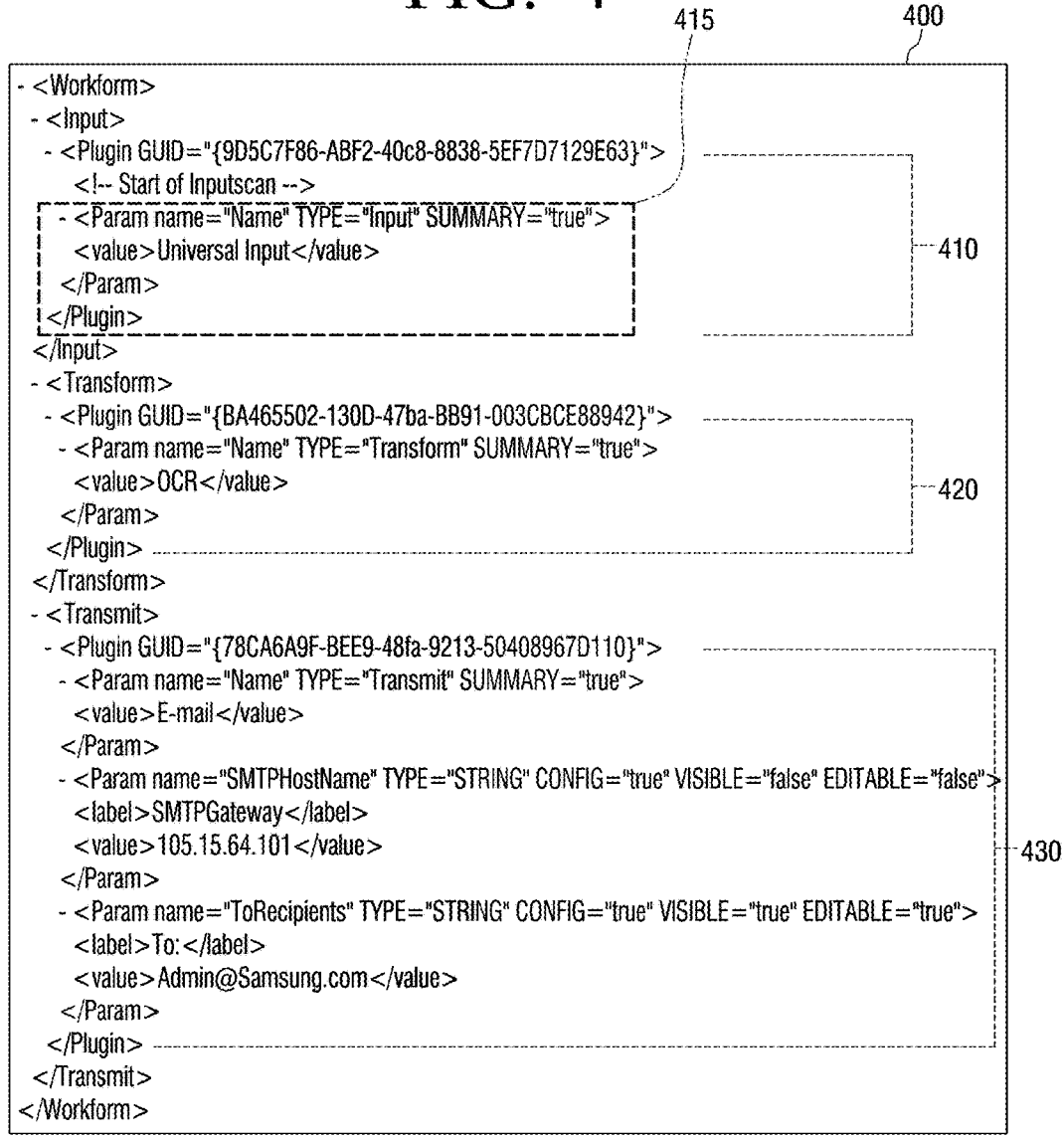
FIG. 4 illustrates an example of a workform generated by the host device.

The exemplary workform generation unit 140 generates a workform into which a universal plug-in is inserted. More specifically, the workform generation unit 140 generates a workform containing a combination of a destination plug-in selected through the UI unit 130 and a universal input plug-in pre-stored in the storage unit 120. In addition, if an operation to be performed by the host device 100 is defined in the workform, the exemplary workform generation unit 140 performs the operation. It is to be understood, however, that the host device 100 may include other functional elements to perform specific operations specified in a particular workform. An example of a workform generated by the workform generation unit 140 is illustrated in FIG. 4.

The exemplary control unit 150 stores a generated workform in the storage unit 120. More specifically, the control unit 150 controls the storage unit 120 to store a workform generated by the workform generation unit 140, and controls the communication interface unit 110 to transmit the stored workform to the workform performing device 300 at the request of the workform performing device 300 (request to perform a job).

In addition, the exemplary control unit 150 processes an adjusted workform and data processed by the workform performing device 300. More specifically, if an adjusted workform and data are received through the communication interface unit 110, the control unit 150 processes the data provided by the workform performing device 300 according to the adjusted workform. For example, in a workform, if the FTP server 2 is set to be a destination, the exemplary control unit 150 controls the communication interface unit 110 to transmit data received from the workform performing device 300 to the FTP server 2. Additionally, if an OCR conversion plug-in is set in a workform, the control unit 150 performs OCR of data received from the workform performing device 300.

As described above, since the host device 100 generates a workform including a universal plug-in, the generated workform may be used by a plurality of devices. Furthermore, since information descriptive of a specific capability of a device to generate the workform is not required, the workform may easily be generated.

Figure 3:
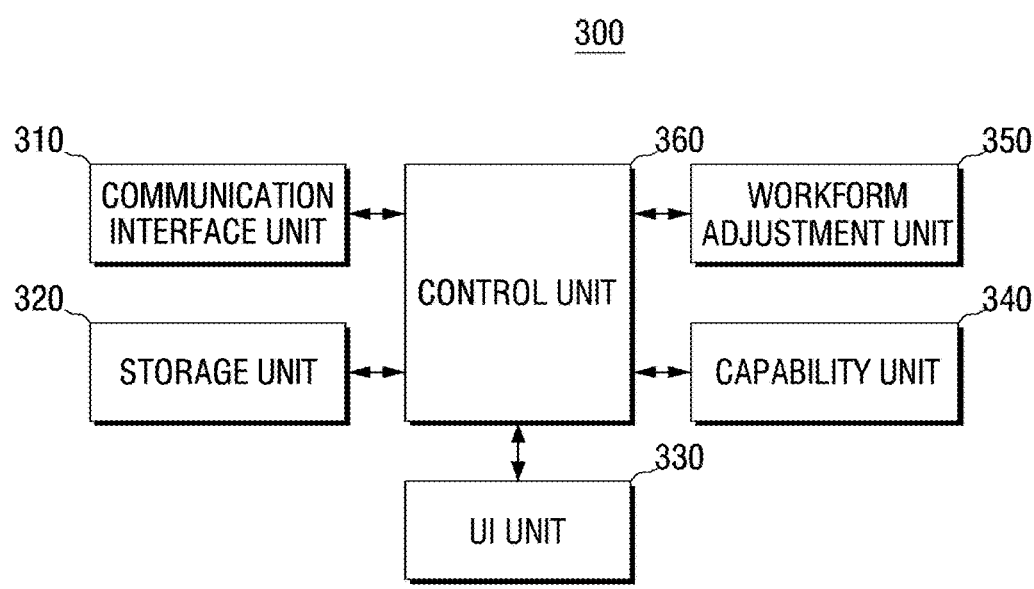
FIG. 3 is a schematic block diagram illustrating a configuration of a workform performing device of FIG. 1.

FIG. 3 is a schematic block diagram illustrating a configuration of the exemplary workform performing device 300 of FIG. 1.

Referring to FIG. 3, the workform performing device 300 may include a communication interface unit 310, a storage unit 320, a user interface (UI) unit 330, a capability unit 340, a workform adjustment unit 350, and a control unit 360. The workform performing device 300 may be implemented as an image forming apparatus, such as a scanner, a copy machine, a printer, and a multifunction device, a server, a computer, and a mobile device, which can perform a job in accordance with a workform.

The communication interface unit 310 is connected to the host device 100 through a communication network (not shown) so as to communicate with the host device 100. The communication interface unit 310 may transmit a workform transmission request command to the host device 100, and may receive, in response thereto a workform containing a universal plug-in from the host device 100. In addition, the exemplary communication interface unit 310 transmits an adjusted workform and data generated or processed by the capability unit 340, as will be discussed below, to the host device 100. More specifically, the communication interface unit 310 enables the workform performing device 300 to be connected to an external device. The communication interface unit 310 may enable the workform performing device 300 to be connected to the host device 100 through a local area network (LAN) or an Internet network, or through a USB port or a wireless port.

The exemplary storage unit 320 has stored therein capability information regarding at least one capability supported by the workform performing device 300, and stores a workform received through the communication interface unit 310. In addition, the storage unit 320 stores a workform adjusted by one or more processes, such as the process discussed below, and data generated or processed by the capability unit 340. The storage unit 320 may be implemented by any suitable storage device, such as, for example, a storage medium external to the workform performing device 300 including, for example, a USB memory which is externally connected to the workform performing device 300. The capability information is information regarding a capability supported by the workform performing device 300. For example, if the workform performing device 300 is a scanner, the capability information may include information indicating that the workform performing device 300 supports scanning and information defining one or more supportable setting values related to scanning.

The exemplary UI unit 330 includes a plurality of capability keys which enable the user to set or select diverse capabilities supported by the workform performing device 300, and displays diverse information provided by the workform performing device 300. The UI unit 330 may be implemented with a touch-sensitive display capable of input and output or with a combination of HID, such as a mouse and/or keyboard, and a monitor. The UI unit 330 may, for example, generate a UI window including an area for selecting a capability of the workform performing device 300, and an area for inputting a setting value corresponding to the selected capability. For example, in the first area, the UI unit 330 may enable the user to select at least one of fax data, email data, first storage data stored in the external storage medium, and second storage data stored in the workform performing device 300, which are data sources supported by the workform performing device 300. The different UI areas may be displayed in separate divisions of a GUI, such as, for example, under separate tabs depicted at tab 605 and tab 705 in FIGS. 6 and 7, respectively. Through the UI window, the user may select one of a plurality of workforms stored in the host device 100, may identify at least one capability supported by the workform performing device 300, and select at least one of the displayed capabilities. Furthermore, through the UI window, the user may select a detailed setting value corresponding to the selected capability.

The capability unit 340 performs a capability of the workform performing device 300, such as, for example, copying, printing, scanning, faxing, or file conversion (OCR), which is supported by the workform performing device 300. For example, if the workform performing device 300 is a fax, the capability unit 340 performs reception and transmission of fax.

The exemplary workform adjustment unit 350 modifies a workform based on a selected capability. More specifically, the workform adjustment unit 350 modifies a workform received through the communication interface unit 310 by replacing a universal plug-in in the workform with a plug-in corresponding to capability information pre-stored in the storage unit 320. For example, if the workform performing device 300 is a scanner, the workform adjustment unit 350 replaces a universal plug-in in the received workform with a plug-in specifying a scanning operation. In The workform adjustment unit 350 may modify the workform to include a preset setting value or a default setting value. For example, if the user has performed scanning at a 200 DPI resolution, the workform adjustment unit 350 may replace the universal plug-in with a plug-in for requesting scanning at a 200 DPI resolution.

The exemplary workform adjustment unit 350 adjusts a parameter of the modified workform relating to the capability, such as a setting value selected by the user. For example, if the workform performing device 300 is a multi-capability peripheral, a universal plug-in may be replaced with a plurality of plug-ins, each of which defining a function that can be performed by the multi-capability peripheral. Accordingly, the workform adjustment unit 350 replaces the universal plug-in with a plug-in corresponding to a capability selected by the user. In this case, if the user selects a specific setting value, the workform adjustment unit 350 adjusts a parameter of the workform by reflecting the specific setting value. If the user does not select a specific setting value, the workform adjustment unit 350 may set the parameter of the workform to a pre-stored setting value or the default setting value, as described above.

The exemplary control unit 360 controls the overall operation of the workform performing device 300 according to a stored control program. If the user selects a workform button, the control unit 360 controls the workform performing device 300 to go into a workform mode, and controls the communication interface unit 310 to access the host device 100. If the user selects a desired workform through the UI unit 330, the control unit 360 retrieves the workform from the host device 100, and controls the workform adjustment unit 350 to modify the retrieved workform to contain the capability of the workform performing device 300. The control unit 360 may also control the storage unit 320 to store the workform modified by the workform adjustment unit 350, and controls the communication interface unit 310 to transmit the modified workform to the host device 100.

Additionally, the exemplary control unit 360 controls the capability unit 340 according to operational data contained in a workform responsive to a user command to perform a job in accordance with the workform. Subsequently, the control unit 360 may control the communication interface unit 310 to transmit to the host device 100 data generated or converted according to performance of a job conforming to the operational data.

Beneficially, the workform performing device 300 modifies the workform in accordance with its capability and, through the use of a universal plug-in the user can easily use the same workform to perform different jobs through a plurality of diverse devices.

FIG. 4 illustrates an example of a workform generated by the host device 100.

Referring to FIG. 4, a workform generated by the host device 100 includes an input plug-in 410 containing universal input data 415. Referring to FIG. 4, the input plug-in 410 includes only "Universal Input" as "<value>," but does not include information regarding a specific capability of the workform performing device 300. That is, a workform generated by the host device 100 includes only a transformation plug-in 420 and a destination plug-in 430, which contains specific data with the exception of specific processing data to be performed by the workform performing device 300, once selected. In the exemplary embodiment shown in FIG. 4, the transformation plug-in 420 is included, but may be omitted or may be replaced with a universal plug-in per user preferences.

As described above, in certain embodiments of the present general inventive concept, a workform generated by the host device 100 includes a universal plug-in which is independent of the capability of the workform performing device 300, and thus can be used for a plurality of devices.

Figure 5:
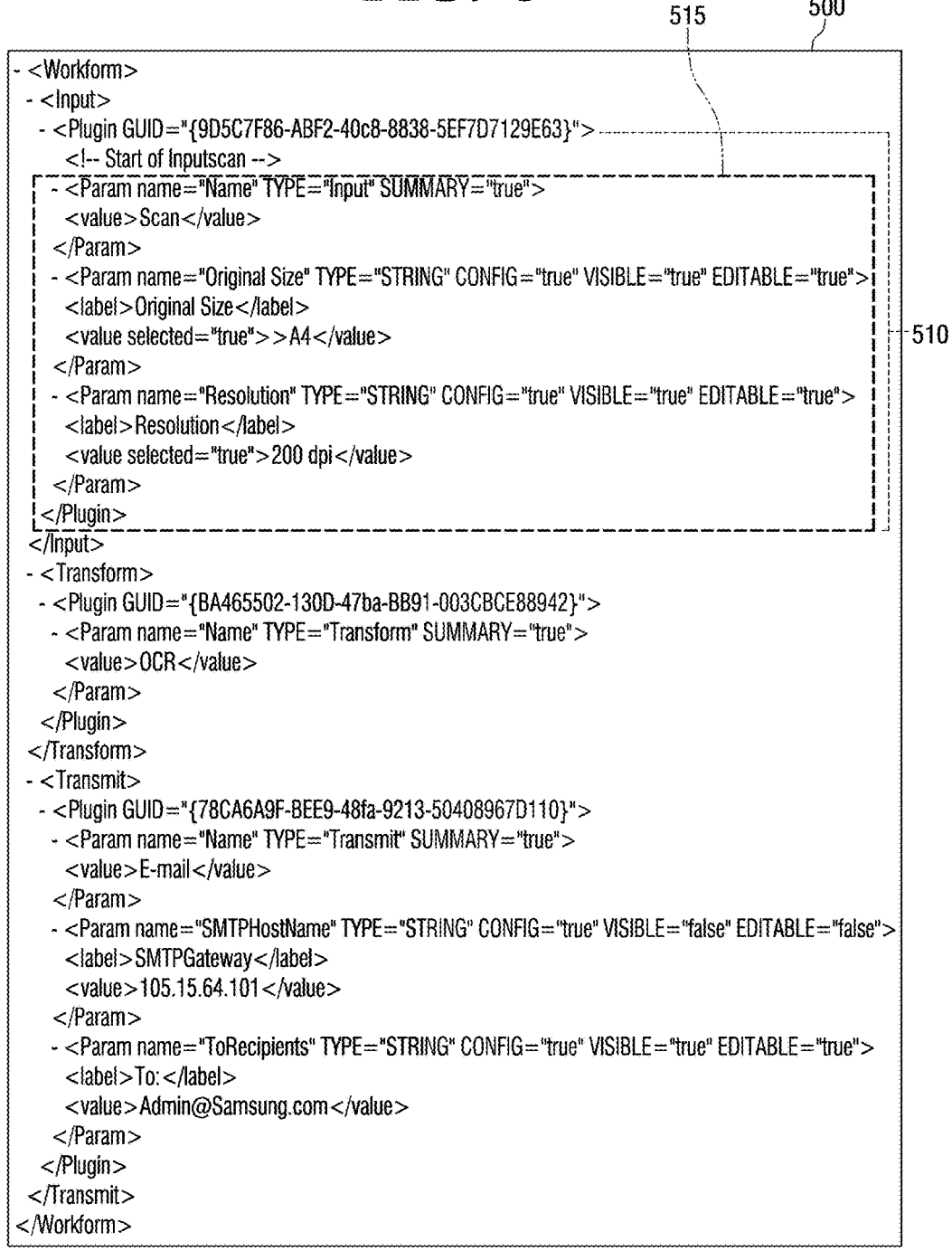
FIG. 5 illustrates an example of a workform adjusted by the workform performing device.

FIG. 5 illustrates an example of a workform modified by the workform performing device 300.

Comparing FIGS. 4 and 5, the workform 400 generated by the host device 100 includes the universal plug-in data 415 in the input plug-in area 410. In the workform 500 modified by the workform performing device 300, the universal plug-in data 415 has been changed to include scanning request data 515. In greater detail, if the workform performing device 300 retrieves the workform 400 including a universal plug-in, the workform performing device 300 modifies the workform 400 to incorporate pre-stored capability information and to change the universal plug-in data in the universal plug-in data area 415 to the specific input plug-in data 515 corresponding to its capability.

In the exemplary embodiment shown in FIG. 5, the universal plug-in 410 has been modified to form the scanning request plug-in 510, but, the universal plug-in area 410 may be replaced with another plug-in or combination of a plurality of plug-ins.

Figure 6:
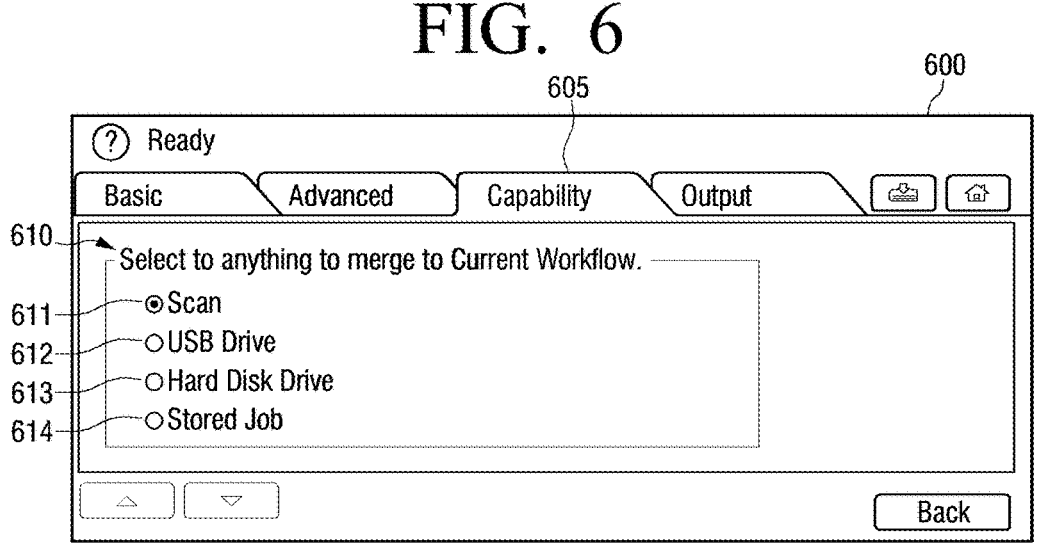
FIGS. 6 to 8 illustrate examples of a UI window to be displayed on the workform performing device.
Figure 7:
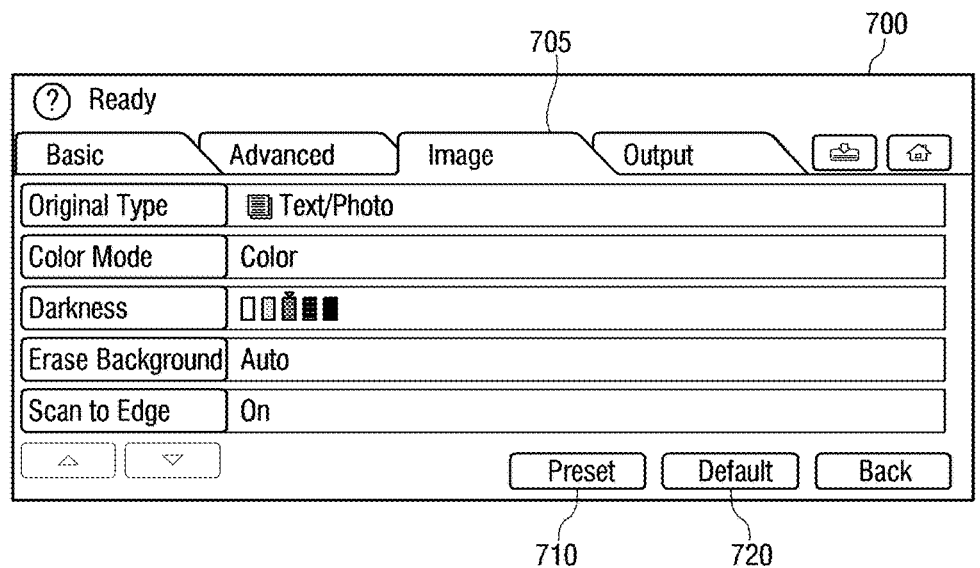
Figure 8:
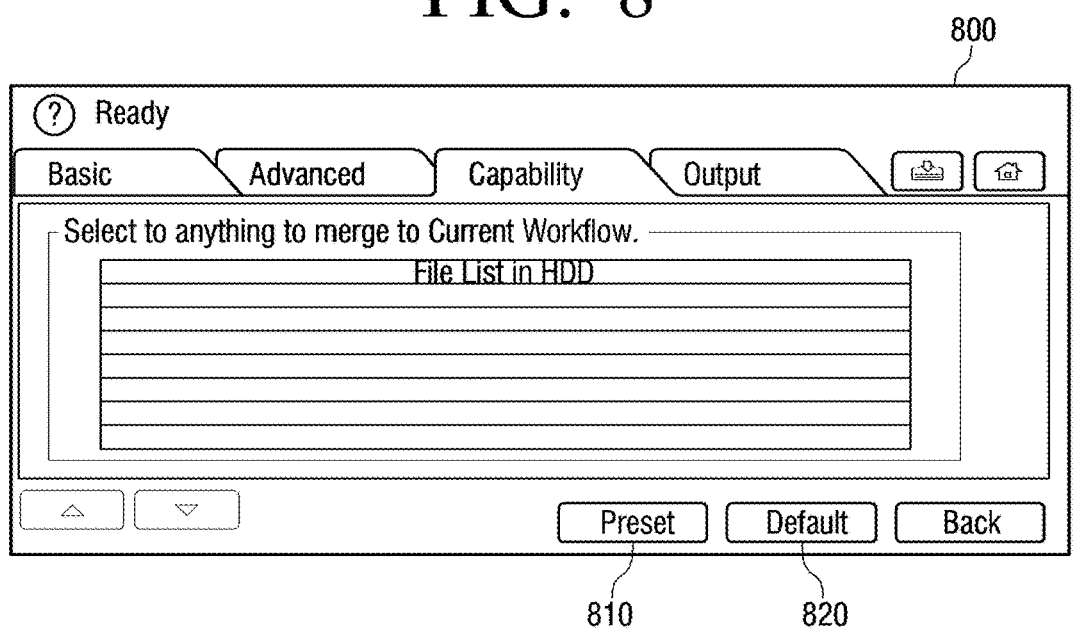

FIGS. 6 to 8 illustrate examples of a UI window to be displayed on the workform performing device 300.

A UI window 600 for selecting a capability supported by the workform performing device 300 is illustrated in FIG. 6. The UI window 600 displays diverse items 611 to 614 which can be used as an input of a workform in the workform performing device 300. Thus, the data displayed in the UI window includes a data abstraction of the workform data. That is, the data embodied through one data format contained in the workform, e.g., XML data, is displayed and modified through data of another format, e.g., graphical user controls. It is to be understood that while the data in the workform is abstracted through common GUI controls in FIGS. 6-8, other data abstractions can be used with the present general inventive concept without deviating from the spirit or intended scope thereof.

In accordance with embodiments of the present general inventive concept, if the user selects one item, a universal plug-in can be replaced with a plug-in corresponding to the item selected by the user. For example, if the user selects the "Scan" item 611 as an input, the workform performing device 300 replaces the universal input plug-in, such as plug-in 410 of FIG. 4, with a scanning request plug-in, such as plug-in 510 of FIG. 5. Additionally, the workform may be adjusted to include a setting value which the user has previously used, or a default value, or may be modified by receiving a setting value from the user using UI windows as illustrated in FIG. 7 or 8.

FIG. 7 illustrates an example of a UI window to be displayed when the user selects the "Scan" item 611. Using the UI window 700, the user may set detailed items related to the scanning operation. In FIG. 7, a "Preset" button 710 may be selected when the user wishes to use a previously set setting value, and a "Default" button 720 may be selected when the user wishes to use a default scanning setting value.

FIG. 8 illustrates an example of a UI window to be displayed when the user selects the "Hard Disk Drive" item 613 in FIG. 6. Referring to FIG. 8, if the user selects the "Hard Disk Drive" item 613 in FIG. 6, the files stored in the hard disk drive may be displayed in a list form, so the user can select one of the files as an input. Also, even when the user selects a "USB Drive" item 612 or a "Stored Job" item 614 in FIG. 6, a UI window similar to the UI window 800 illustrated in FIG. 8 may be displayed.

In certain embodiments of the present general inventive concept, such as described with reference to FIGS. 6 to 8, the UI windows change in sequence corresponding to the user's selection, such as by selecting tab controls 605 or 705. However, UI configurations other than those of FIGS. 6 and 7 are intended to fall within the scope of the present general inventive concept. For example, the UI windows of FIGS. 6 and 8 may be displayed together in a single window or the UI windows of FIGS. 6 to 8 and a UI window related to another item may be displayed together in a single window.

In the exemplary embodiments of the present general inventive concept, a workform includes a universal plug-in, and thus can be used for a plurality of devices. That is, a workform generated by the host device 100 may be used in terminal devices such as a personal computer or a mobile phone as well as the workform performing device 300. For example, "File Browsing Input," "Drive Backup Input," and the like may be used in a terminal device, and "Picture Browsing Input," "File Browsing Input," and the like may be used in a mobile phone.

Figure 9:
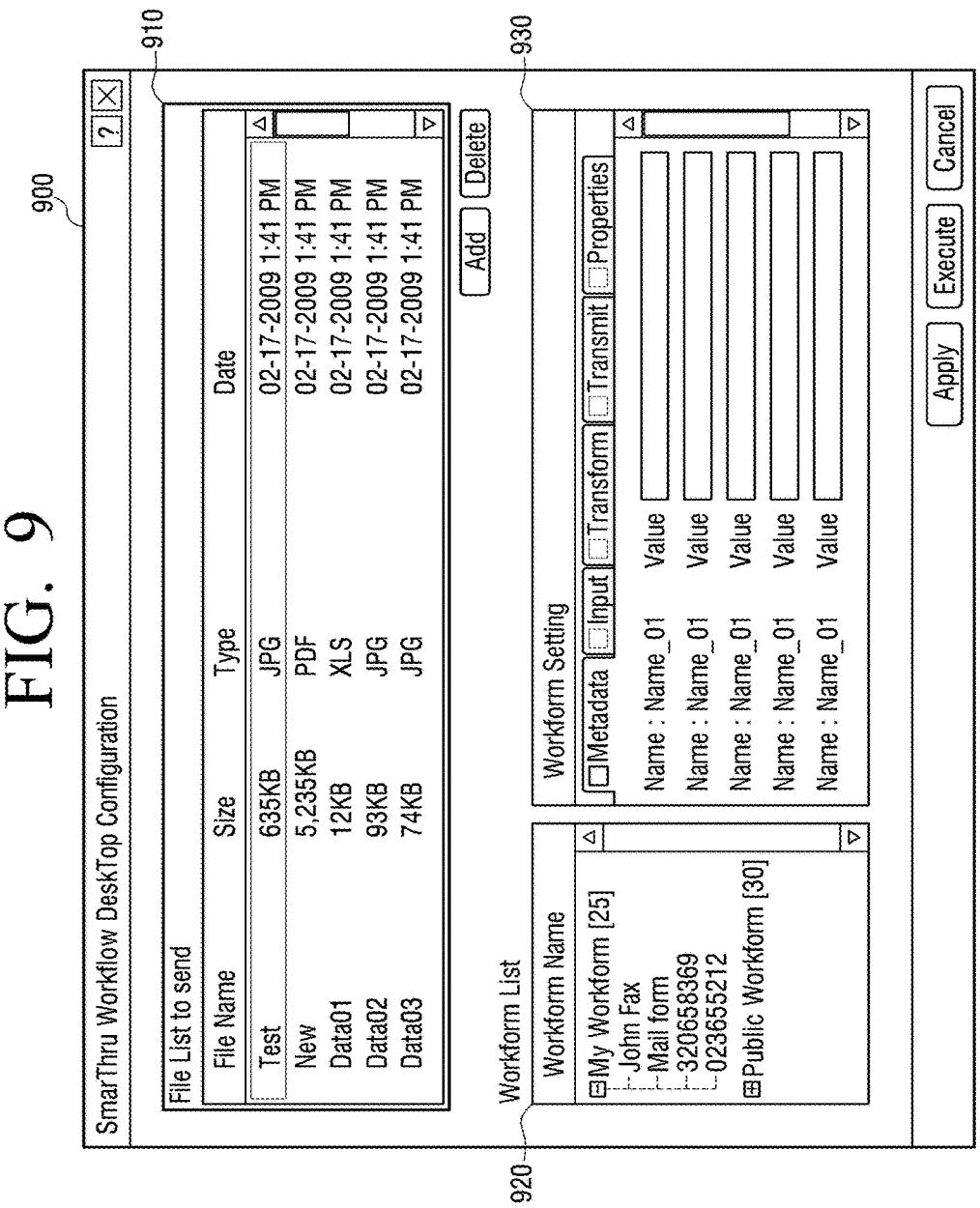
FIG. 9 illustrates an example of a UI window displayed on the host device.

FIG. 9 illustrates an example of a UI window to be displayed on a terminal device such as a personal computer when using a workform generated by the host device 100. Referring to FIG. 9, the UI window 900 may include an area 910 for selecting a file, an area 920 for selecting a workform, and an area 930 for selecting specific settings to be incorporated in the workform.

Using such a UI window 900, the user may perform job in accordance with a workform operation simply by selecting a workform in the area 920 and selecting a file in the area 910.

Figure 10:
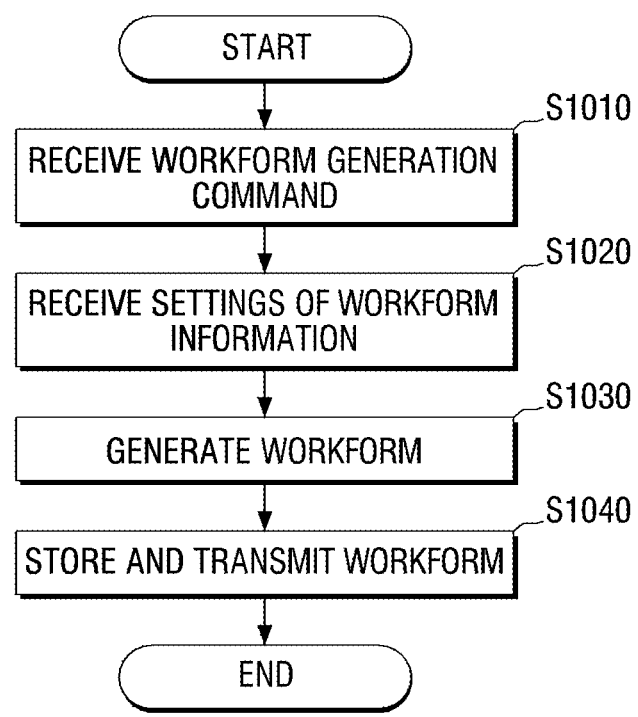
FIG. 10 is a flow chart illustrating a method for generating a workform using a host device according to an exemplary embodiment of the present general inventive concept.

FIG. 10 is a flow chart illustrating an exemplary method for generating a workform using the host device 100 according to an exemplary embodiment of the present general inventive concept.

Referring to the exemplary method depicted in FIG. 10, in operation S1010, the host device 100 receives a user command to generate a workform. In operation S1020 the host device 100 displays a UI window for setting various workform information items, such as the selection of a destination plug-in from a plurality of pre-stored destination plug-ins.

In operation S1030, if the host device 100 generates a workform in which a universal plug-in is incorporated. For example, a workform may be generated by combination of the selected destination plug-in and a pre-stored universal input plug-in.

In operation S1040, the host device 100 stores the generated workform and transmits the stored workform to the workform performing device 300 at the request of the workform performing device 300 (request to perform a job).

Subsequent to the operations of FIG. 10 being performed, if the host device 100 receives a workform modified by the workform performing device 300 and data processed by the workform performing device 300, the host device 100 processes the processed data based on the modified workform. For example, if in a workform, the FTP server 2 is set to be a destination, the host device 100 transmits data received from the workform performing device 300 to the FTP server 2.

Accordingly, in the method for generating a workform, a workform including a universal plug-in is generated, and thus can be used for a plurality of devices. The method for generating a workform as illustrated in FIG. 10 may be used by a host device having a configuration as illustrated in FIG. 2, and may also be used by other host devices having different configurations.

FIG. 11 is a flow chart illustrating an exemplary method for performing in accordance with a workform using the workform performing device 300 according to an exemplary embodiment of the present general inventive concept.

Referring to FIG. 11, in operation S1110, if the workform performing device 300 receives a workform containing a universal plug-in, in operation S1120 the workform performing device 300 displays, for example, a UI window including a first area for selecting a capability of the workform performing device 300, and a second area for inputting a setting value corresponding to the selected capability. Since the user interface window to be displayed on the workform performing device 300 has been described with reference to FIGS. 6-8, detailed description is not repeated here. In operation S1130, the user selects data descriptive of at least one capability supported by the workform performing device 300 from among pre-stored capability information items using controls displayed UI window. If the workform performing device 300 has only a single capability, displaying the UI window and selecting a capability may be omitted.

In operation S1140, the workform performing device 300 modifies the workform based on the selected capability. In greater detail, the workform may be modified by replacing generic data in the universal plug-in of the workform with specific data to define a plug-in corresponding to the selected capability. For example, if the workform performing device 300 is a scanner, the universal plug-in data of the workform is replaced with a scanning request data. The workform may reflect a pre-stored setting value or a default setting value. The workform adjustment unit 350 adjusts a parameter of the modified workform using the capability selection and setting values selected by the user. It is to be understood that while the exemplary embodiments are described to illustrate the incorporation of data into the workform sequentially, e.g., data regarding selection of a capability of the workform performing device 300 being incorporated followed by specific parameter values being incorporated into the workform, all data to be incorporated into the workform in a single operation responsive to the user selecting a capability of the workform performing device 300.

In operation S1150, the workform performing device 300 transmits the adjusted workform to the host device 100. In certain embodiments of the present general inventive concept, the adjusted workform may be stored in the workform performing device 300.

In operation S1150, the capability of the workform performing device 300 is performed according to the adjusted workform. For example, an operation flow set in the workform may be performed according to the user command to perform a job in accordance with the workform, and data generated or converted according to performance of the operation are transmitted to the host device 100 together with the adjusted workform.

As can be appreciated from the above description, in the exemplary method for performing a job in accordance with a workform using the workform performing device 300, the workform performing device 300 modifies the workform to reflect its capability, so there is no need for prior knowledge of specific capabilities of a particular device or whether the workform can establish job parameters at the particular device. In accordance with the present general inventive concept, the user may easily use the same workform in a plurality of devices. The method for performing a job in accordance with a workform as illustrated in FIG. 11 may be used by a workform performing device having a configuration as illustrated in FIG. 3, and may also be used by other workform performing devices having different configurations.

Certain embodiments of the present invention provide for functional components thereof to be manufactured, transported, marketed and/or sold as machine instructions encoded on machine-readable media. The present general inventive concept, when so embodied, can be practiced regardless of the processing platform on which the machine instructions are executed and regardless of the manner by which the machine instructions are encoded on the machine-readable medium.

It is to be understood that the machine-readable medium discussed in the paragraph above may be any medium on which the instructions may be encoded and then subsequently retrieved, decoded and executed by a processor, including electrical, magnetic and optical storage devices, and wired, wireless, optical and acoustical communication channels. The machine-readable medium may be a computer-readable medium that includes either or both of persistent storage, referred to herein as "computer-readable recording media" and as spatiotemporal storage, referred to herein as "computer-readable transmission media". Examples of computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The computer-readable recording media may be distributed across components, to include such distribution through storage systems interconnected through a communication network. The computer-readable transmission media may transmit encoded instructions on electromagnetic carrier waves or signals, or as acoustic signals through acoustically transmissive media. Moreover, the processor instructions may be derived from algorithmic constructions of the present general inventive concept in various programming languages, the mere contemplation of which illustrates the numerous realizable abstractions of the present general inventive concept.

Although various embodiments of the present general inventive concept have been illustrated and described, it will be appreciated by those skilled in the art that changes may be made to these embodiments without departing from the principles and spirit of the general inventive concept, the scope of which is defined in the appended claims and their equivalents.

What is claimed is:

1. A workform performing device connectable to a host device and which performs a job using a workform, the workform performing device comprising:
   a storage configured to store capability information regarding at least one particular capability supported by the workform performing device that is different than at least one capability of another of a plurality of workform performing devices also connectable to the host device;
   a communicator configured to receive a generic workform transmitted from the host device, the generic workform transmitted from the host device including a universal input plug-in that is generic to the plurality of workform performing devices inclusive of the workform performing device connectable to the host device;
   a user interface (UI) unit configured to enable a user to select the at least one particular capability from among the capability information stored in the storage;
   a processor configured to adjust the received generic workform transmitted from the host device at the workform performing device by replacing or modifying at least some of the information in the universal input plug-in, which is generic to the plurality of workform performing devices connectable to the host device, with specific input plug-in data based on the selected particular capability, and to perform the job at the workform performing device using the workform that is adjusted at the workform performing device,
   wherein the at least one particular capability selected is at least one of fax data, email data, and scan data, and
   wherein the communicator transmits data generated after performing the job to the host device together with the adjusted workform.

2. The workform performing device according to claim 1, wherein the generic information in the universal plug-in comprises information which at least one workform performing device of the plurality of workform performing devices accepts to define operations to perform the job.

3. The workform performing device according to claim 1, wherein the processor controls the storage to store the adjusted workform.

4. The workform performing device according to claim 1, wherein the user interface unit enables the user to select at least one of first storage data stored in an external storage medium, and second storage data stored in the workform performing device, which are data types supported by the workform performing device.

5. The workform performing device according to claim 1, wherein the workform performing device is at least one of an image forming apparatus, a server, a computer, and a mobile device, which can perform the job in accordance with the workform.

6. The workform performing device according to claim 1, wherein the user interface unit displays the at least one capability supported by the workform performing device, and enables the user to select at least one of the displayed capability and select a setting value corresponding to the selected capability.

7. A method for performing a job in accordance with a workform using a workform performing device connectable to a host device and which performs the job using the workform, the method comprising:
receiving a generic workform, which was generated by a host device, including a universal input plug-in that is transmitted from the host device that is generic to a plurality of workform performing devices inclusive of the workform performing device connectable to the host device and is capable of being replaced or modified by the workform performing device;
selecting at least one particular capability from among pre-stored capability information regarding the at least one particular capability supported by the workform performing device that is different than at least one capability of another of the plurality of workform performing devices;
adjusting the received generic workform including the universal input plug-in transmitted from the host device by replacing or modifying at least some of the information in the universal input plug-in, which is generic to the plurality of workform performing devices, with specific input plug-in data based on the selected particular capability;
performing the job using the adjusted workform; and
transmitting data generated after performing the job to the host device together with the adjusted workform,
wherein in the selecting of the at least one capability, at least one of fax data, email data, and scan data is selected.

8. The method according to claim 7, wherein the universal plug-in comprises information which may be modified by at least one workform performing device to perform the job.

9. The method according to claim 7, further comprising: storing the adjusted workform.

10. The method according to claim 7, wherein in the selecting of the at least one capability, at least one of first storage data stored in an external storage medium, and second storage data stored in the workform performing device, which are inputs supported by the workform performing device is selected.

11. The method according to claim 7, wherein the workform performing device is at least one of an image forming apparatus, a server, a computer, and a mobile device, which can perform the workform.

12. The method according to claim 7, wherein in the selecting of the at least one capability, the at least one capability supported by the workform performing device is displayed, at least one of the displayed capability is selected, and a detailed setting value corresponding to the selected capability is selected.

* * * * *